No. 630,492. Patented Aug. 8, 1899.
M. DÉRI.
ARRANGEMENT FOR EXCITING MAGNETS OF DYNAMO ELECTRIC MACHINES.
(Application filed Feb. 23, 1899.)
(No Model.) 2 Sheets—Sheet 1.

WITNESSES:
F. W. Wright
S. C. Connor

INVENTOR
MAX DÉRI
BY
Howson and Howson
ATTORNEYS.

No. 630,492. Patented Aug. 8, 1899.
M. DÉRI.
ARRANGEMENT FOR EXCITING MAGNETS OF DYNAMO ELECTRIC MACHINES.
(Application filed Feb. 23, 1899.)
(No Model.) 2 Sheets—Sheet 2.
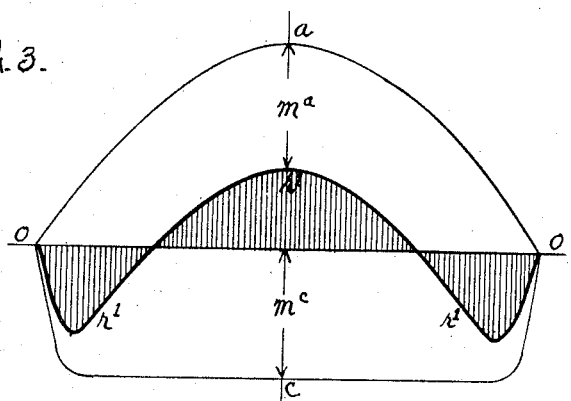
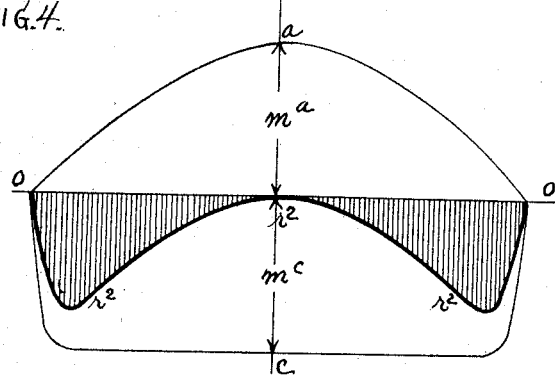
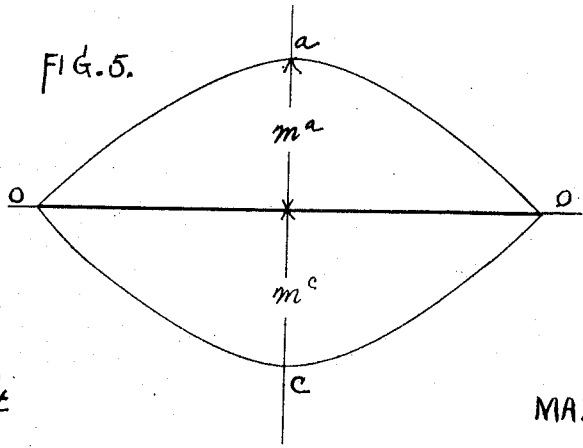
WITNESSES:
F.W. Wright
M.O. Miles
INVENTOR
MAX DÉRI
BY Howson & Howson
HIS ATTORNEYS.

United States Patent Office.

MAX DÉRI, OF VIENNA, AUSTRIA-HUNGARY.

ARRANGEMENT FOR EXCITING MAGNETS OF DYNAMO-ELECTRIC MACHINES.

SPECIFICATION forming part of Letters Patent No. 630,492, dated August 8, 1899.

Application filed February 23, 1899. Serial No. 706,560. (No model.)

*To all whom it may concern:*

Be it known that I, MAX DÉRI, a subject of the Emperor of Austria-Hungary, residing at Vienna, in the Province of Lower Austria, in the Empire of Austria-Hungary, have invented certain new and useful Improvements in Arrangements for Exciting the Magnets of Dynamo-Electric Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to arrangements for exciting the magnets of dynamo-electric machines, such as were described in the specification of Letters Patent No. 614,373, dated November 15, 1898, in which a construction of the field-magnets and connections of the armature and field-magnet windings were set forth, whereby the prejudicial reaction of the armature-currents was prevented. I have since found that with the arrangement described in the said specification, whereby a fixed resulting field was obtained, a certain disposition of winding of the compensation-coils is the most advantageous for enabling the machine to work without sparking. For this purpose it is necessary that the flow of magnetic force which is excited by the compensation-coils shall, both as regards its totality and as regards its maximum value, be equal and contrary to the flow emitted by the armature. As the field excited by the armature-currents (armature-field) always has a distribution corresponding to the sinus law, on account of the uniform winding of the armature-surface, the most effective compensation will be obtained by also winding uniformly with the compensation-coils the entire periphery of the field-magnets which is turned to the armature. With such an arrangement the magnetic flow transversely to the main field will be entirely neutralized.

Figure 1:
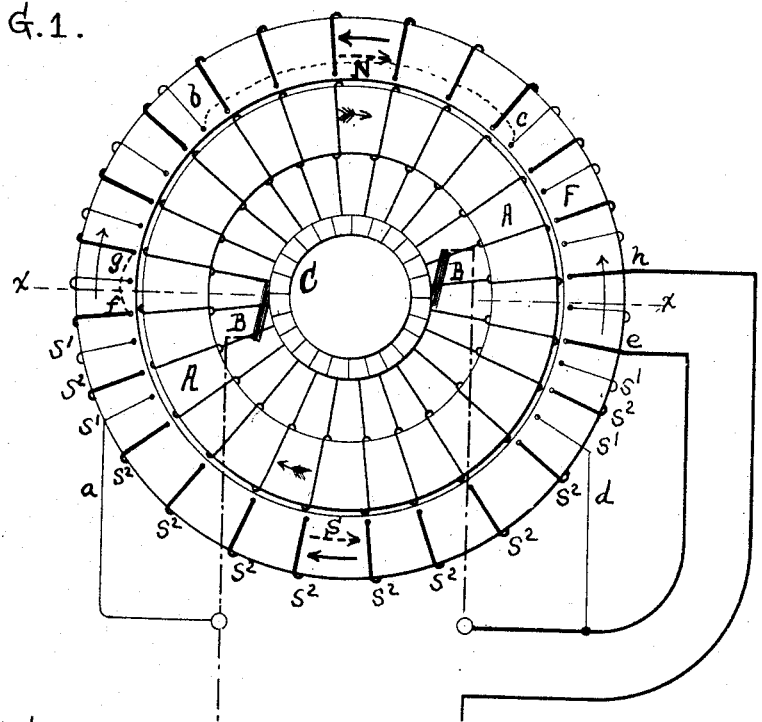
Figure 2:
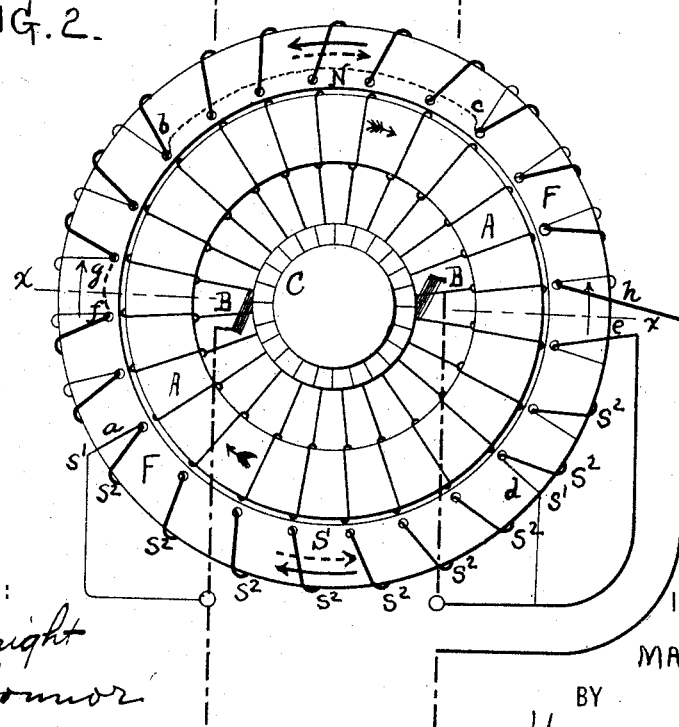

In the accompanying drawings, Figures 1 and 2 are diagrams of two arrangements of field and armature windings which may be employed in carrying out my invention, while Figs. 3, 4, and 5 are graphic diagrams illustrative of my invention.

Figs. 1 and 2 show in diagram the arrangement of the magnetic field F and of the windings of field and armature, and by way of example they are shown in both instances for a shunt-excited dynamo. In both instances the field F surrounds the armature A uniformly. B B are the brushes, and C the commutator. The actual exciting-coils *a b c d* are drawn in fine lines, while the compensating coils *e f g h* are shown by heavy lines, just as are drawn the armature-coils and its connections with the commutator. The arrows in the magnetic field show the direction of flow of current, the finely-drawn arrows for the exciting-coils, and the heavy arrows for the compensating coils, the latter in two directions as the direction of the armature-current changes. The exciting-coils, which, by way of example, are here shown connected in multiple arc, cover only part of the magnetic-field surface and produce the two magnetic poles N and S. The compensating coils *e f g h* are also connected to produce two poles, so that the consecutive poles would be produced at the axis X X if they could be developed. The compensating coils, however, are arranged in number of windings and position of periphery exactly like the armature-windings. They cover, also, the entire surface which is turned to the armature and are in the circuit in series with the armature-windings. Consequently the exciting forces leaving the exciting-coils and the armature-windings, without regard to the question whether these armature-windings belong to a generator or a motor, are in form and in intensity equal. In all instances the exciting forces will be produced in opposing directions, so that therefore there cannot be produced a magnetic flow in the direction of X X, crossing the magnetic fields N S—that is, the magnetic reaction of the armature is completely annulled. In Fig. 1 the exciting and compensating coils are shown in separate holes of the magnet-body. In Fig. 2 the holes are shown partly common to both.

The arrangement of the exciting-coils may be manifold, as with the different dynamo-machines in use. In the case here considered, however, it is a condition that the iron of the magnet shall uniformly surround the entire circle of the armature. It is important that the compensating windings not only in number, but also in their position around the periphery, and as also in the number of poles, shall be arranged exactly like the armature-windings, and also that these windings shall be connected in series with the armature and opposite to these. As a construction more easily understood the drawings show ring-wound coils in the magnetic field and armature; but of course drum-windings could be used either for one part or the other, or both parts. The arrows on the armature show the direction in which same revolves.

In Figs. 3, 4, and 5 the armature-field is represented by the sinus curve $a$. The compensation opposite field is represented by the curve $c$ and the field resulting from both of the covers $r'$ and $r^2$. The armature-periphery corresponding to the length of a pole distance $o\ o$ is here shown developed as a straight line. If, as shown at Fig. 3, the total values of the magnetic flow—that is to say, the areas $o\ a\ o$ and $o\ c\ o$—were equal, but the maximum values $m\ a$ and $m\ c$ were different, a resulting field in the form $r'$ would be produced. If, on the other hand, as at Fig. 4, the maximum values $m\ a$ and $m\ c$ were equal, while the areas are different, then the resulting field would have the form $r^2$; but if both the form and the strength of the magnetic flow—that is to say, the area and the maximum value—are equal, as in Fig. 5, according to the present invention, then no transverse field will result.

I claim as my invention—

A dynamo having an armature and a field-magnet provided with two sets of excitation-coils, one set being compensation-coils arranged uniformly like the armature-coils, whereby the magnetic flow produced by the compensation-coils shall be contrary to, but practically equal to, the armature-field both as to form and strength, substantially as described.

In testimony that I claim the foregoing as my invention I have signed my name in presence of two subscribing witnesses.

MAX DÉRI.

Witnesses:
JOSEF RUBARCH,
ALVESTO S. HOGUE.